United States Patent [19]

Motier et al.

[11] 3,884,856
[45] May 20, 1975

[54] ELECTROCOATING COMPOSITION CONTAINING STYRENE-MALEIC ANHYDRIDE COPOLYMER AND EPOXY ESTER RESIN EXHIBITING HIGH THROWING POWER

[75] Inventors: John F. Motier, Secane, Pa.; Donald L. Marion, Turnersville, N.J.

[73] Assignee: Atlantic Richfield Company, Philadelphia, Pa.

[22] Filed: Nov. 19, 1973

[21] Appl. No.: 416,906

[52] U.S. Cl.......... 260/23 EP; 204/181; 260/18 EP; 260/23 AR; 260/23 S; 260/29.6 NR; 260/836; 260/837 R
[51] Int. Cl............................................. C08g 45/08
[58] Field of Search.......... 260/23 S, 23 AR, 23 EP, 260/836, 837 R, 29.6 NR, 18 EP

[56] References Cited
UNITED STATES PATENTS

| | | | |
|---|---|---|---|
| 2,934,516 | 4/1960 | Hicks | 260/23 |
| 3,107,226 | 10/1963 | Tonner et al. | 260/23 |
| 3,136,736 | 6/1964 | Washburne et al. | 260/837 |
| 3,215,756 | 11/1965 | Lombardi et al. | 260/837 |
| 3,238,170 | 3/1966 | Wolff et al. | 260/29.6 |
| 3,308,077 | 3/1967 | Pattison et al. | 260/18 |
| 3,317,457 | 5/1967 | Zimmerman et al. | 260/837 |
| 3,429,946 | 2/1969 | Verdol et al. | 260/837 |
| 3,493,483 | 2/1970 | Gacesa et al. | 204/181 |
| 3,703,455 | 11/1972 | Sekmakmas | 204/181 |
| 3,835,076 | 9/1974 | Jeffery et al. | 260/23 |

*Primary Examiner*—Eugene C. Rzucidlo
*Attorney, Agent, or Firm*—John C. Martin, Jr.

[57] ABSTRACT

A new composition suitable for electrocoating is disclosed. The composition contains partially esterified styrene-maleic anhydride copolymers at least partially neutralized to render said copolymer water dispersible combined with carboxyl functional esters of epoxy resins at least partially neutralized to render said resins water dispersible which can be used in an aqueous medium in anionic electrophoretic deposition or organic coatings onto electrically conductive substrates. This combination yields unexpectedly high throwing powers because of the ability of the combined vehicle to be electrodeposited at much higher voltages than is possible with the epoxy resin by itself. In addition the final cured coating has extremely good corrosion resistance.

15 Claims, No Drawings

ELECTROCOATING COMPOSITION CONTAINING STYRENE-MALEIC ANHYDRIDE COPOLYMER AND EPOXY ESTER RESIN EXHIBITING HIGH THROWING POWER

BACKGROUND OF THE INVENTION

The present invention relates to new compositions suitable for electrocoating at high voltages. These compositions contain a combination of partially neutralized, partially esterified sytrene-maleic anhydride copolymers combined with carboxyl functional esters of epoxy resins dispersed in water. These compositions can include conventional pigments and filler type additives as well as coupling agents.

The electrophoretic deposition of organic materials to produce uniform coatings on substrates can be used in many parts of the metal finishing industry. Hood in "Metal Finishing", p. 61, August, 1967, describes the advantages of this type of process in finishing a variety of metal parts. The process is more efficient than dip or spray painting because paint utilization is higher and the coating operation can be fully automated. Furthermore, solvents can be nearly eliminated reducing considerably fire hazard and air pollution. The electrophoretic coatings are generally cured by conventional baking techniques. The process is particularly useful in applying coatings to all electrically accessible surfaces. The ability of the paint to coat on surfaces not readily accessible to the electric potential is called throwing power and will depend on the nature of the paint and in particular on the type of resinous binder used in the paint. Obviously, the maximum amount of throwing power is sought by the finishing industry to protect all metallic surfaces. The mechanism of throwing power and the parameters affecting its magnitude are explained by D. R. Hays and C. S. White in in Journal of Paint Technology, V. 41, No. 535, p. 461, August, 1969.

The prior art teaches that various vinyl copolymers can be epoxy modified to produce durable solvent-resistant coatings. This literature teaches that when a vinyl copolymer such as styrene-maleic anhydride copolymer is used, the cross-linking occurs through the carboxyl groups of the copolymer and the epoixde functionality of the epoxy. The literature suggests that polyepoxides in general can be utilized in the coating compositions and some of the more well-known epoxides are the glycidol ethers of polyhydric alcohols, the epoxides of unsaturated esters, poly esters, diolefins, and epoxidized drying oils.

In the instant invention the styrene-maleic anhydride copolymer resin which is partially esterified with an aliphatic alcohol and at least partially neutralized to render it water dispersible is used as one component in the electrophoretic bath. The other component is an ester of an epoxy resin provided with carboxylic functionality and at least partially neutralized to render it water dispersible in the electrophoretic bath. The use of the styrene-maleic anhydride copolymer resin in this manner unexpectedly greatly enhances the throwing power of the combination in the electrophoretic bath. Subsequently after this combination of resins has been deposited on the substrate they are cross-linked or cured by baking at elevated temperatures for a time sufficient to cross-link the styrene-maleic anhydride copolymer with the epoxy ester. Thus the cross-linking reaction takes place after the components have been electrocoated on the substrate. This cross-linking differs from the prior art in that it involves oxygen promoted radical graft polymerization of the partially esterified styrene-maleic anhydride copolymers onto the drying oil (unsaturated) fatty acid side chains of the esterified epoxy resin.

SUMMARY OF THE INVENTION

In accordance with this invention an electrophoretic coating composition bath is prepared by the dispersion in water of (a) an at least partially neutralized partial ester of a styrene-maleic anhydride copolymer resin esterified to from about 25 per cent to 125 per cent half ester with an aliphatic alcohol having from about 10 to 30 carbon atoms. The styrene-maleic anhydride copolymer has a styrene to maleic anhydride mole ratio of from about 1:1 to 4:1 and a molecular weight of from about 500 to 4000. The partial ester copolymer has an acid number of from about 20 to 350 and is neutralized to the extent of about 20 per cent to 100 per cent based on the acid number of the partial ester copolymer with a neutralization agent selected from the group consisting of ammonia, lower aliphatic amines, lower alkanol amines, and alkali metal hydroxides; and (b) an oxidatively cross-linkable carboxyl functional ester of an epoxy resin, the epoxy resin being preferably of the bisphenol-A type. It is used in an amount ranging from about 30 to 300 per cent by weight of the copolymer resin (a) described and is neutralized to the extent of 20 to 100 per cent based on its acid number and with a neutralizing agent selected from the group consisting of ammonia, lower aliphatic amines, lower alkanol amines, and alkali metal hydroxides.

The combination of the dispersed copolymer of (a) with the dispersed epoxy ester (b) has an exceptionally high throwing power and thus gives excellent results in electroplating electrically conductive substrates. After the combination is cross-linked or cured on the substrate the resulting coating among other excellent properties has exceptionally good corrosion resistance as well as impact strength and flexibility.

It is an object of this invention therefore to provide a new composition suitable for electrocoating electrically conductive substrates.

It is another object of this invention to provide an electrocoating composition containing a styrene-maleic anhydride copolymer and an epoxy ester resin exhibiting high throwing power.

It is another object of this invention to provide a method for electrocoating electrically conductive substrates with a composition containing styrene-maleic anhydride copolymer and epoxy ester resin at high electrodepositions voltages.

It is another object of this invention to provide a coating composition produced by the electrodeposition of a combination of styrene-maleic anhydride copolymer and epoxy ester resin on an electrically conductive substrate and subsequently cross-linking said copolymer and said epoxy ester resin on said electrically conductive substrate.

Other objects of this invention will be apparent from the description which follows and from the claims.

DESCRIPTION OF THE INVENTION

The styrene-maleic anhydride copolymer component has a mole ratio of styrene to maleic anhydride from about 1:1 to 4:1 and preferably from about 2:1 to 4:1 with a molecular weight of from about 500 to 4000 and preferably from about 1000 to 2500.

The copolymers are partially esterified to about 25 to 125 per cent and preferably 70 to 110 per cent half-ester with an aliphatic alcohol or mixture of aliphatic alcohols having from about 12 to 30 carbon atoms, preferably 14 to 26, and most preferably 14 to 22 carbon atoms. The alcohols, preferably alkanols may be saturated or olefinically unsaturated, e.g. having up to three olefinic bonds. Suitable alcohols include dodecyl, cetyl, stearyl, eicosyl, and tetracosyl. The acid number of the partial ester of the copolymer will be between 20 and 350, preferably 50 to 200; and neutralized to the extent of 20 to 120 per cent, preferably 30 to 100 per cent based on the acid number of the partial ester copolymer. The neutralizing agent is selected from the group consisting of ammonia, lower aliphatic amines, lower alkanol amines, and alkali metal hydroxides. Particularly useful amines include those wherein each alkyl group has up to about 5 carbon atoms, preferably up to about three carbon atoms. Preferred agents include dimethanol amine, diethanol amine, diisopropanol amine, dimethyl amine, diethyl amine and triethyl amine. The water utilized in the electrophoretic bath solution should be deionized water in order to maintain consistency and prevent the various ions that may be present in ordinary water from affecting the coating process.

By modifying the copolymers by forming partial esters with alcohols there is produced resins with improved flexibility, decreased acid number and wider compatibility with oleoresinous type coating vehicles. These resins are unusual in that they do not have to have olefinic unsaturation to undergo cross-linking reaction typical of oleoresinous polymers. Moreover the acid number of the esterified copolymer is such that the salt formation with the aforementioned neutralization agents provides a water dispersible or water soluble system.

The second major component in the coating composition is a carboxyl functional epoxy resin which has been previously esterified with a fatty acid or acids. The fatty acids are preferably those derived from drying or semi-drying of oils and thus contain olefinic unsaturation. They can be derived by saponification of the oil. These drying and semi-drying oils are described by F. A. Norris in the "Encyclopedia of Chemical Technology", Second Edition, Vol. 8, starting at page 783. Generally, the drying oils are those which have an iodine number above about 130 and the semi-drying oils are those which have an iodine number of from about 90 to 130 determined by the method ASTM-D 1467-57T. Examples of such oils include linseed, soya, safflower, perilla, poppy seed, sunflower, tung, walnut, dehydrated castor, corn, herring and sardine oil. The epoxy resins are preferably of the bis-phenol-A type, i.e. the reaction product of epichlorohydrin and bisphenol-A giving the diglycidyl ether of bisphenol-A. These are described in Chapter 2, pages 2 to 9 of the book "Handbook of Epoxy Resins" by Lee and Neville, McGraw-Hill, New York (1967). Similar useful epoxy resins are described in U.S. Pat. No. 3,282,863 at Col. 2, line 67 through line 8, Col. 3 and lines 25 through 32 of Col. 3. These resins are esterified with one or more of the aforementioned fatty acids and the resulting epoxy ester resins are provided with carboxyl functionality with either half acid ester formation between residual hydroxyl groups of the epoxy ester resin and dicarboxylic acid anhydrides such as succinic or phthalic anhydrides, or alternatively the carboxyl functionality can be introduced by reaction of maleic anhydride with olefinic sites on the drying or semi-drying oil fatty acid moieties by the well known maleinization reaction. The latter method is preferred due to improved hydrolytic stability of the polymer. The degree of carboxyl functionality formation or maleinization is sufficient to produce vehicles readily soluble or dispersible in water after neutralization with ammonia, a lower aliphatic amine, a lower alkanol amine or an alkali metal hydroxide as described above for the neutralization of the styrene-maleic anhydride component. Commonly the acid numbers of the epoxy esters provided with carboxyl functionality as described will be in the range of from 40 to 80 mgs. KOH/grams resin.

The products above described are commercially available. The type employed in the Examples which follow is a linseed oil fatty acid ester of a bisphenol-A type epoxy resin which has been maleinized so that in solution in 2-butoxyethanol at an 80 weight per cent solids content the resin exhibits an acid number of 49 to 53, typically, and a Gardener-Holt viscosity of Z4–Z6.

The amount of the second component, i.e. the epoxy ester resin described, ranges from about 30 to 300 weight per cent of the styrene-maleic anhydride copolymer resin and preferably in an amount ranging from about 60 to 150 per cent of the styrene-maleic anhydride copolymer resin. In order to render the epoxy ester resin having the carboxylic functionality water soluble or water dispersible it is neutralized to the extent of about 20 per cent to 100 per cent based on the acid number of the resin utilizing a neutralizing agent selected from the group set forth above.

A coupling solvent may be employed in the bath and its concentration can be up to 10 per cent; however, it is preferable that it be present in an amount up to 5 per cent by weight, i.e. 0 to 5 per cent, based on the coating composition bath. Examples of suitable coupling solvents are oxygenated hydrocarbon liquids having up to 12 carbon atoms, lower alkyl ethers of a lower alkylene glycol such as monopropylether of propylene glycol, n-butyl ether of ethylene glycol, and ethyl ether of diethylene glycol. Other suitable solvents include n-butanol and lower molecular weight hydrocarbons having up to about 12 carbon atoms such as toluene, xylene, and petroleum solvents.

The major component of the bath is deionized water and the resin solids content is usually about 5 to 30 per cent, preferably about 8–20 per cent, by weight of the bath. The bath may also contain pigments such as titanium dioxide, iron oxide, carbon black or basic lead silico chromate, in amounts up to about 10 per cent, preferably 1 to 6 per cent by weight of the bath.

The electrophoretic deposition of the composition of this invention on an electroconductive surface can be achieved by passing a direct electric current of 50 to 500 volts, preferably 100 to 350 volts, through the electrophoretic composition bath to an anode comprising the conductive surface to be coated which is immersed in said bath. This electric current can be applied for a sufficient period of time to give a film of the desired thickness. Generally, the time would be no longer than about 10 minutes and preferably 1 to 5 minutes sufficient to give a film of the desired thickness, generally from about 0.1 to 5.0 mils and preferably 0.5 to 1 mil. Subsequently, the coated surface is exposed to a temperature of about 200°F. to 500°F., preferably 250°F. to 450°F. for a time sufficient to cure the coating composition, i.e. cross-link the styrene-maleic anhydride copolymer component with the epoxy ester component and provide a flexible film which is corrosion and solvent resistant.

A particular important aspect of the instant invention is that the combination of resins exhibits a high throwing power. Throwing power can be determined in a variety of ways. The method employed herein is known as the General Motors throwing power test and is described by Hays and White in the previously cited article. The test device consists of two phosphated steel panels held three-eighths inch apart by rubber shims along the side edges. The bottom is left open. The boxlike structure is lowered into the electrocoating bath and the electrophoretic deposition is carried out at the specified conditions of voltage and time. After deposition the panels are separated, rinsed with deionized water, and baked at the appropriate temperature. The throwing power is the number of inches from the bottom of the test panels that has been coated. The voltage employed is usually the highest possible with any given resin system to afford the maximum throwing power. The limiting voltage is called the rupture voltage. Beyond this potential the deposited film can no longer insulate the conducting substrate and is ruptured by the applied voltage.

The examples which follow are provided to illustrate the invention in additional detail but are not to be construed as limiting.

EXAMPLE I

Preparation of the Stearyl Alcohol Half-Ester of Styrene-Maleic Anhydride Resin

A styrene-maleic anhydride copolymer, weighing 19,172 g., containing 3 moles of styrene per mole of maleic anhydride, and having a molecular weight of about 1900, and an acid number of 276, was charged with 13,062 g. stearyl alcohol into a 10 gallon reactor. The charge was heated with stirring to 350°F. for 90 minutes under a nitrogen blanket. The charge was cooled to 325°F., and removed from the reactor. After it solidified, it was ground and analyzed. The product has an acid number of 98 and contained 4.4 per cent unreacted alcohol.

EXAMPLE II

Preparation of a Mixed Alcohol Half-Ester of Styrene-Maleic Anhydride Resin

A styrene-maleic anhydride copolymer, weighing 19,172 g. and containing 3 moles of styrene per mole of maleic anhydride, having a molecular weight of about 1900 and an acid number of 280, was charged with 13,062 g. of a mixed alcohol containing 16 to 20 carbon atoms into a 10 gallon reactor. The charge was heated with stirring to 350°F. for 90 minutes under a nitrogen blanket. The charge was cooled to 325°F. and removed from the reactor. It was allowed to solidify and then ground and analyzed. The resin had an acid number of 102 and contained 4.2 per cent unreacted alcohol.

EXAMPLE III

Preparation of an Electrodeposition Bath with Epoxy Ester as the Sole Resinous Component A typical commercial oxidatively cross-linkable carboxyl functional ester of an epoxy resin was employed. This resin consisted of the linseed oil fatty acid epoxy ester, the epoxy portion being the bisphenol-A type, which ester had been maleinized such that the component in solution in 2-butoxyethanol at 80 weight per cent solids content had an acid number in the range of 49–53 and a Gardner-Holt viscosity of Z4–Z6. The epoxy ester solution, 1000 grams, and triethylamine, 73 grams, were mixed thoroughly. Deionized water, 6927 grams, was added gradually with vigorous agitation. The final bath had 10 per cent resin solids content and was opalescent. The bath characteristics and deposition parameters are set forth in the Table following Example IV.

EXAMPLE IV

Preparation of an Electrodeposition Bath from Equal Portions of Epoxy Ester and Ester Copolymer from Example II The copolymer ester from Example II, 400 grams, was dissolved in 133.4 grams of 2-butoxyethanol and mixed with 500 g. of the epoxy ester resin solution in 2-butoxyethanol used in Example III. The resulting mixture was neutralized with 50.6 grams of triethylamine and diluted slowly with 6916 grams of deionized water yielding a milky white bath of 10 weight per cent resin solids. Bath characteristics and coating parameters are shown in the following Table.

The test panels used in obtaining the data shown in the table were commercial zinc phosphated cold rolled steel. Prior to electrocoating the panels were rinsed with deionized water and baked at 250°F. for 6 minutes. Coated specimens were prepared from the respective baths produced as described in Example III and Example IV. Coating conditions are shown in the Table for the respective electrodeposition baths. After coating the panels were rinsed with deionized water and baked at 350°F. for 25 minutes.

Throwing power was determined as set forth in the forementioned article by Hays and White. The panels, treated as described above, measured 4 in. × 18 in.

For corrosion testing the coated panels were scribed with an "X" and subjected to a 5 per cent aqueous sodium chloride fog at 95°F. and 100 per cent relative humidity for 240 hours. The appearance of the respective panels is summarized in the table.

TABLE

Bath Characteristics and Deposition Parameters

| | Example III (Epoxy Ester Alone) | Example IV (50/50 Epoxy Ester/Copolymer, Ex.II) |
|---|---|---|
| Bath Solids, % | 10.0 | 10.0 |
| Conductance, μmhos/cm. | 1750 | 900 |

TABLE — Continued

Bath Characteristics and Deposition Parameters

| | Example III (Epoxy Ester Alone) | Example IV (50/50 Epoxy Ester/Copolymer, Ex.II) |
|---|---|---|
| pH | 8.3 | 8.1 |
| Neutralization, % | 80 | 46 |
| Rupture Voltage, volts | 90 | 310 |
| Application Conditions | 80 volts × 2 min. | 290 volts × 2 min. |
| Temperature, °C. | 23–25 | 23–25 |
| Film Thickness, mil | 0.75 | 0.75 |
| Throwing Power, in. | 5.0 | 9.75 |
| Bake Cycle, °F. × min. | 350 × 25 | 350 × 25 |
| Salt Spray, 240 hours (A.S.T.M. B117-64) | 1.5 mm creep from scribe and face rusting | 1.0 mm creep from scribe |

It is apparent from the results shown in the Table that the epoxy ester resin alone ruptures at 90 volts and exhibits a mediocre throwing power of five inches when the deposition is carried out at 80 volts for two minutes.

Incorporation of 50 per cent by weight of the esterified styrene-maleic anhydride copolymer from Example II with 50 per cent by weight of the epoxy ester resin increases the rupture voltage to 310 volts, almost a 3.5 fold increase, and enables a throwing power of 9¾ inches to be attained in a coating operation at 290 volts for 2 minutes.

In addition, coatings made in accordance with this invention exhibit excellent impact properties, typically a direct impact of 120 in.-lbs. and reverse impact of 15 in.-lbs. as well as excellent flexibility as shown by a typical mandrel bend of: Pass one-half in.

We claim:

1. A composition suitable for electrocoating an electrically conductive substrate in an aqueous medium using high voltages and characterized by exhibiting high throwing power and crosslinkable by oxygen promoted radical graft polymerization comprising:
   a. a partial ester of styrene-maleic anhydride copolymer resin esterified to about 25 to 125 per cent half-ester with a saturated or olefinically unsaturated alkanol of 12 to 30 carbon atoms said styrene-maleic anhydride copolymer having a mole ratio of styrene to maleic anhydride of about 1:1 to 4:1 and a molecular weight of about 500 to 4000, said partial ester of said copolymer having an acid number in the range of about 20 to 350 and neutralized to the extent of 20 to 120 per cent based on said acid number of said partial ester copolymer with a neutralization agent selected from the group consisting of ammonia, lower aliphatic amines, lower alkanol amines and alkali metal hydroxides and
   b. a carboxyl functional epoxy resin esterified with an olefinically unsaturated fatty acid, said olefinically unsaturated fatty acid being derived from a semidrying oil or drying oil having an iodine value of greater than 90, said carboxyl functionality being provided by either (1) half acid ester formation between residual hydroxyl groups of the epoxy ester resin and a dicarboxylic acid anhydride, or (2) by reaction of maleic anhydride with olefinic sites on the unsaturated fatty acid moieties of said esterified epoxy resin, said epoxy ester provided with carboxyl functionality having an acid nunber in the range of from 40 to 80 and neutralized to the extent of 20 to 120 per cent based on said acid number of said resin with a neutralization agent selected from the groups consisting of ammonia, a lower aliphatic amine, a lower alkanol amine and an alkali metal hydroxide wherein said epoxy resin is in the range of from 30 to 300 weight per cent of said esterified copolymer and wherein said esterified copolymer and said epoxy resin range in amount from 5 to 30 weight per cent of said aqueous medium.

2. The composition of claim 1 wherein said epoxy resin is in the range of from 60 to 150 weight per cent of said esterified copolymer and wherein said esterified copolymer and said epoxy resin range in amount from 8 to 20 weight per cent of said aqueous medium.

3. The composition of claim 1 wherein said alcohol has 14 to 22 carbon atoms.

4. The composition of claim 1 wherein said styrene-maleic anhydride copolymer resin is esterified to about 70 to 110 per cent half ester said copolymer having a mole ratio of styrene to maleic anhydride of about 2:1 to 4:1 and a molecular weight of about 1000 to 2500.

5. The composition of claim 4 wherein said half ester of said copolymer has an acid number in the range of 50 to 200 and is neutralized to the extent of 30 to 100 per cent based on said acid number.

6. The composition of claim 5 wherein said neutralization utilizes a lower aliphatic amine.

7. The composition of claim 6 wherein said lower aliphatic amine is triethylamine.

8. The composition of claim 1 wherein said epoxy resin is the reaction product of epichlorohydrin and bisphenol-A.

9. The composition of claim 1 wherein said epoxy resin is esterified with a fatty acid derived from linseed oil.

10. The composition of claim 8 wherein said reaction product is esterified with a fatty acid derived from linseed oil.

11. The composition of claim 1 wherein said epoxy resin of said epoxy resin esterified with an olefinically unsaturated fatty acid is the reaction product of epichlorohydrin with bisphenol-A and after esterification with said olefinically unsaturated fatty acid is provided with carboxyl functionality by half acid ester formation between residual hydroxyl groups of said esterified epoxy resin and a dicarboxylic anhydride.

12. The composition of claim 11 wherein said dicarboxylic anhydride is selected from the group consisting of succinic anhydride and phthalic anhydride.

13. The composition of claim 1 wherein said epoxy resin of said epoxy resin esterified with an olefinically unsaturated fatty acid is the reaction product of epichlorohydrin with bisphenol-A and after esterification with said olefinically unsaturated fatty acid is provided with carboxyl functionality by the reaction of maleic anhydride with the olefinic sites on the olefinically unsaturated fatty acid moieties.

14. The composition of claim 11 wherein said carboxyl functionality is at least partially neutralized with a lower aliphatic amine sufficient to render said composition dispersible in said aqueous medium.

15. The composition of claim 13 wherein said carboxyl functionality is at least partially neutralized with a lower aliphatic amine sufficient to render said composition dispersible in said aqueous medium.

* * * * *